Sept. 14, 1954 G. H. STRICKLAND 2,689,110
HOUSEHOLD REFRIGERATOR WITH HUMIDITY CONTROL
Filed Oct. 19, 1949 2 Sheets-Sheet 1
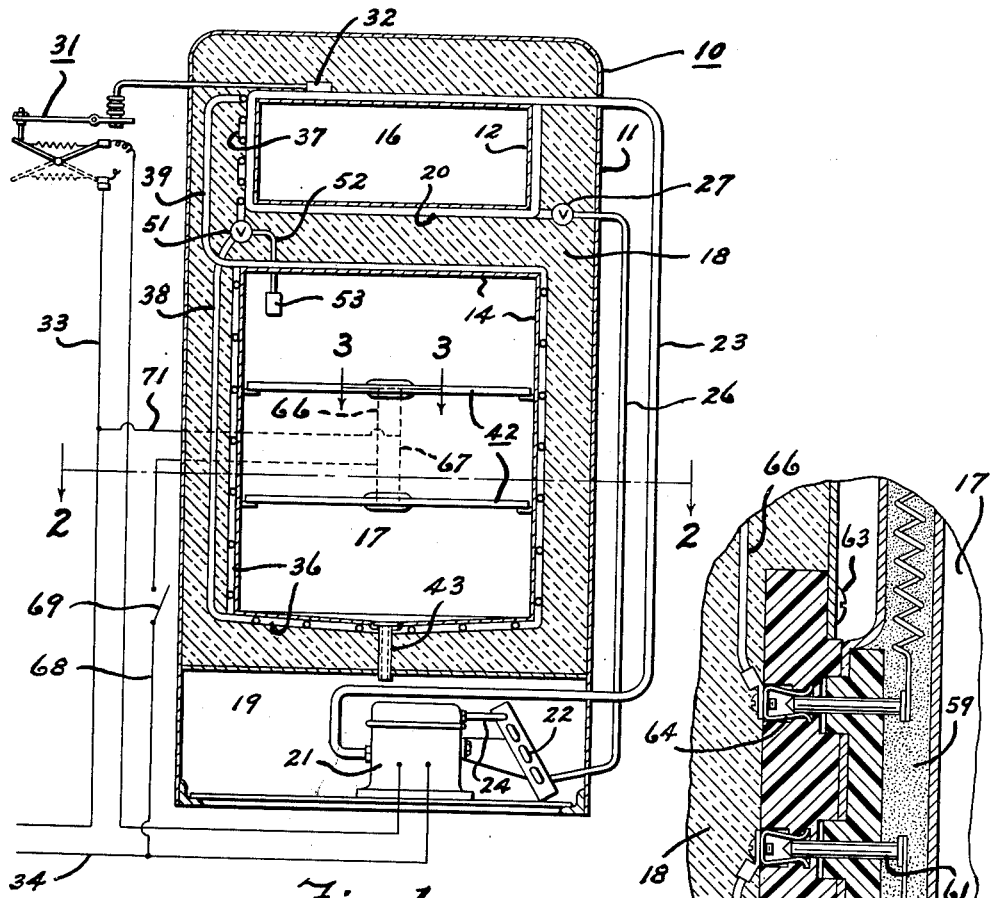
Fig.1
Fig.3
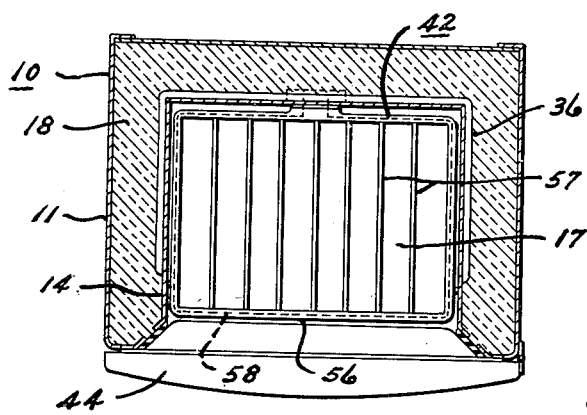
Fig.2
INVENTOR.
GEORGE H. STRICKLAND.
BY
Spencer Hardman & Fehr.
HIS ATTORNEYS Sept. 14, 1954  G. H. STRICKLAND  2,689,110
HOUSEHOLD REFRIGERATOR WITH HUMIDITY CONTROL
Filed Oct. 19, 1949  2 Sheets-Sheet 2

INVENTOR.
GEORGE H. STRICKLAND.
BY
Spencer Hardman & Fehr.
HIS ATTORNEYS

Patented Sept. 14, 1954

2,689,110

UNITED STATES PATENT OFFICE 2,689,110

HOUSEHOLD REFRIGERATOR WITH HUMIDITY CONTROL

George H. Strickland, Oakwood, Ohio, assignor to General Motors Corporation, Dayton, Ohio, a corporation of Delaware Application October 19, 1949, Serial No. 122,221

3 Claims. (Cl. 257—3)

In one type of mechanical refrigerator in popular demand today, it is customary to provide two compartments, one (hereafter called the frozen food compartment) maintained at a temperature below freezing for the preservation of frozen foods and the other (hereafter called the normal food storage compartment) maintained at a higher temperature, approximately 40° to 50° F., for the preservation of non-frozen foods. In such a two-temperature refrigerator it is very desirable to maintain a high degree of humidity in the normal storage compartment and this is generally accomplished by providing sufficient cooling surface whereby the temperature gradient between the cooling surface and the air within the compartment is minute or quite small. In this manner the circulation of air (convection currents) and the dehumidifying effect of the cooling unit are reduced to a minimum.

This type of refrigerator presents a major problem. For example, since there is but a small temperature gradient between the cooling surfaces and the air within the normal storage compartment, the temperature of everything within the compartment including the shelves, the walls and even the stored food closely approximates the temperature of the cooling surfaces. Accordingly any excess humidity in the air of the compartment, occurring by reason of high temperature and humidity conditions in the surrounding atmosphere, condenses not only on the cooling surfaces but also on everything else within the compartment.

My invention relates to this problem and has for its primary object a method of and an apparatus for causing all of the excess humidity or moisture in the normal food storage compartment to condense and collect on the cooling surfaces. Stated in another way, the primary object of my invention is to provide a method of and an apparatus for removing excess moisture from the normal storage compartment without materially reducing the temperature thereof below the normal desired temperature.

More specifically, my invention has for its object a method of and an apparatus for lowering the temperature of the cooling surfaces to a temperature substantially below the temperature at which the surfaces are normally maintained to condense or freeze moisture thereon while at the same time adding sufficient heat to the compartment to offset the heat removed by the cooling surfaces thereby to maintain the air therein at the original selected temperature.

Other more specific objects and advantages of my invention will become apparent from the following specification and drawings wherein:

Fig. 1 is a vertical sectional view of a two-temperature household refrigerating apparatus having my invention embodied therein;

Fig. 2 is a horizontal sectional view taken on the line 2—2 of Fig. 1, showing a shelf constructed in accordance with my invention mounted in the food compartment of the apparatus;

Fig. 3 is an enlarged fragmentary sectional view taken on the line 3—3 of Fig. 1, showing a heating element within a part of the food supporting shelf;

Figure 5:
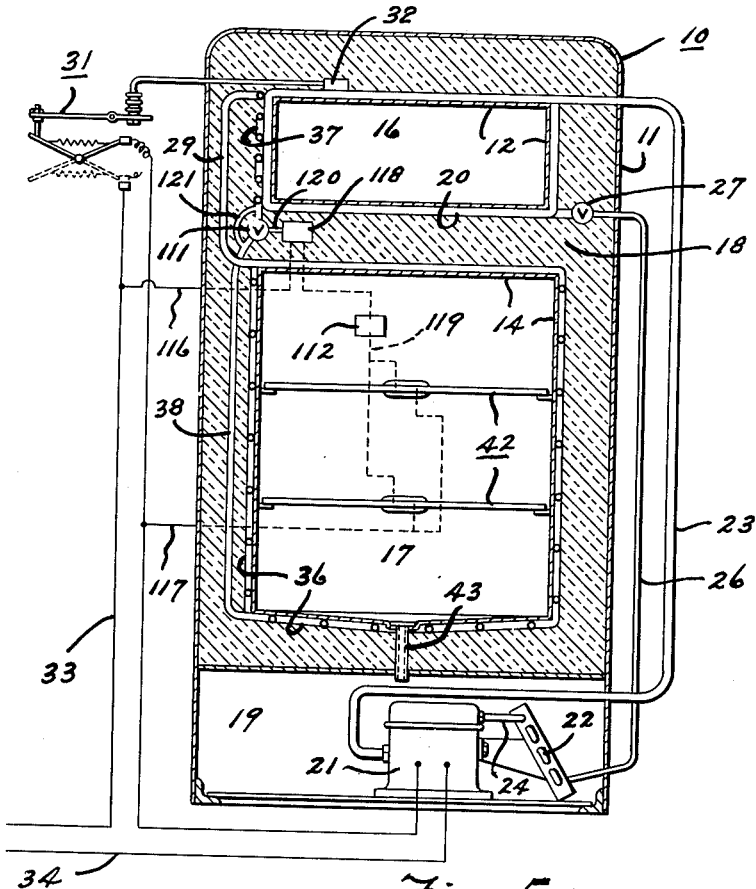
Fig. 5 is a view similar to Fig. 1 showing an automatic control system for the refrigerating apparatus.

I have shown my invention embodied in a conventional two-temperature refrigerator of the type wherein the normal food storage compartment is cooled by a secondary refrigerating system. The refrigerator includes a cabinet 10 provided with an outer metal shell or panels 11 and upper and lower metal liners 12 and 14 forming walls of two refrigerated food storage compartments 16 and 17 respectively. The upper compartment 16 is the freezing or frozen food storage compartment and the lower compartment 17 is the normal food storage compartment. Any suitable or desirable insulating material 18 may be located between the liners 12 and 14 and between these liners and the outer cabinet shell or panels 11. The outer shell 11 of cabinet 10 extends beyond the insulated bottom wall of compartment 17 and provides a machine compartment 19 in the lowermost part of the cabinet. The upper or frozen food compartment 16 is shown as cooled by a conventional closed refrigerating system including an evaporator 20, a motor-compressor unit 21 and a condenser 22. The unit 21 and condenser 22 form a refrigerant translating device which is mounted in the machine compartment 19. A conduit 23 leading from the evaporator 20 connects with the suction side of the compressor within unit 21, a conduit 24 connects the unit 21 with condenser 22 and a conduit 26 connects the condenser 22 with the evaporator 20. The evaporator 20 comprises a plurality of loops of pipe extending around and secured in intimate thermal contact with outer wall surfaces of the line 12 of compartment 16. Liquid refrigerant cooled and condensed in condenser 22 flows into evaporator 20 under the control of a suitable restrictor or expansion valve 27. In order to maintain compartment 16 at a low or below freezing temperature I employ a thermostatically operated snap-acting switch, generally represented by the reference character 31, and utilize a closed thermal system including the bulb 32 for actuating the switch as is conventional in the art and now in common practice. The bulb 32 is mounted on evaporator 20 so as to be responsive to the temperature thereof for causing the thermal system to actuate switch 31 and close and/or open its contacts interposed in the one wire 33 of the two-wire 33 and 34 power circuit for intermittently starting and stopping the unit 21. The switch 31 may be of the type which is readily adjustable by the user of the refrigerating apparatus.

The lower or normal food storage compartment 17 is shown as cooled by a secondary refrigerating system or closed circuit including a plurality of pipe loops or bends 36 disposed in contact with exterior wall surfaces of liner 14 and a plurality of pipe loops or bends 37 disposed in intimate heat exchange relation with the pipe loops of the primary evaporator 20. A conduit 38 connects the lower portion of pipe bends 37 with the lowermost portion of pipe loops or bends 36 and a conduit 39 connects the upper portion of pipe loops 36 with the uppermost portion of loops 37 to provide the closed secondary circuit. The pipe loops 36 form the evaporator or refrigerant evaporating portion of this secondary refrigerating circuit and pipe loops 37 form the condenser or refrigerant condensing portion thereof. The cooling surfaces presented by the inner wall surfaces of liner 14 opposite pipe loops of evaporator 36 of the secondary circuit are sufficient to permit cooling of the interior of compartment 17 to a selected temperature, approximately 40° to 50° F., with only a minute temperature gradient existing between the cooling surface, walls of liner 14, and the air within compartment 17. A plurality of shelves generally represented by the reference character 42 are supported, in any suitable or conventional manner, within the higher temperatured storage compartment 17 and are preferably spaced and insulated from the metal compartment walls or liner 14. A drain pipe 43 has its inlet communicating with the interior of compartment 17 and extends downwardly through its insulated bottom wall to a point exteriorly thereof. Doors, such as the door 44 shown in Fig. 2 of the drawings, may close the access opening leading to each of the separated compartments 16 and 17.

According to my invention, the surface contact between the primary evaporator 20 and the secondary condenser 37 is made sufficiently large to permit the secondary evaporator 36 (when not restricted by the valve 51 as hereafter described) to operate at substantially the temperature of the primary evaporator 20. This is a distinguishing difference in the present disclosure over conventional cold wall refrigerators wherein a valve such as valve 51 is omitted and the surface contact between the primary evaporator and the secondary condenser is limited or intentionally made small to obtain a predetermined relatively high and substantially constant temperature gradient between the temperature of the primary evaporator and the temperature of the secondary evaporator. Normally, of course, the primary evaporator 20 operates at a low temperature whereas it is desired to operate the secondary evaporator 36 at about 40° to 50° F. Accordingly, a thermostatic throttle valve 51 is interposed in the conduit 38 between the condenser 37 and the evaporator 36. This valve 51 is operated by a conventional closed thermostatic system comprising a movable element such as a bellows (not shown) and the tube 52 and bulb 53. Bulb 53 is located within compartment 17 so as to be responsive to temperatures therein. Thus the valve 51 normally restricts or throttles the amount of circulation of refrigerant in the secondary circuit so that the temperature of evaporator 36 thereof maintains the selected or normal storage temperature desired in compartment 17. As the temperature within compartment 17 rises, the valve 51 opens wide to permit the cooling surfaces 36 to operate at a slightly lower temperature. I also provide means, energizable at will, to dissipate artificial heat directly into compartment 17. This heat dissipating means is, in the present disclosure, an electrically energizable heater which may, for illustrating my invention, be mounted or contained in the bounding rim or frame of one or each of the shelves 42. For example, each shelf 42 comprises a hollow metal, tubular-like in cross-section, bounding rim or frame 56 (see Figs. 2 and 3) having a plurality of small bars or rods 57 secured thereto and extending from the front to the rear sides thereof (see Fig. 2) for the support of food products thereon. An electric heating element in the form of a wire coil 58 is located in and extends continuously around the bounding frame 56 of shelf 42. The heating element 58 is embedded in suitable non-metallic material 59 which material is preferably a good conductor of heat so as to rapidly transfer heat from the heater 58 to walls of the bounding rim or frame 56 of the shelf 42 for dissipation into compartment 17. Two terminal posts or plugs 61, welded or otherwise suitably secured to ends of heater coil 58, project outwardly from the back side of each shelf 42. A terminal plug receiving block 62, of insulating material, is secured to the exterior back wall of liner 14 of compartment 17 by screws or the like 63. This block 62 is provided with conventional plug receiving openings containing spring clips or the like 64, for engaging and completing an electric circuit from wires 66 and 67 to the heater element 58. Wire 66 is connected, by a wire 68, to the power line wire 34 and a manual or hand-operated switch 69 is interposed therein. Wire 67 is connected by a wire 71, to the power line wire 33 in front of the automatically operated switch 31 so that closing of switch 69 will energize the heating elements 58 irrespective of whether or not the contacts of switch 31 are closed.

My improved refrigerator as so far described operates as follows: Normally the compartment 16 is refrigerated to a below-freezing temperature whereas the valve 51 maintains the secondary evaporator 36 at a temperature sufficient to maintain the compartment 17 at a temperature of from 40° to 50° F. During this normal operation, the temperature of the cooling surfaces, inner wall portions of liner 14 opposite evaporator loops 36, due to the large surface area, is only slightly below the temperature within the compartment 17.

If an excess amount of humidity or moisture is present within compartment 17, it may be removed without materially changing the temperature within compartment 17 by closing the switch 69 to turn on the electric heaters 58. This tends to raise the temperature within compartment 17 and causes the thermostat 53 to open the valve 51 to its full position thereby permitting the secondary evaporator 36 to operate at a much lower temperature. This low temperature within the evaporator 36 causes the excess moisture to condense or freeze upon the cooling surfaces and at the same time removes the excess heat imparted to the compartment 17 by the heaters. In other words, during this cycle the evaporator 36 and the heaters 58 operate as a dehumidifying device. When this dehumidifying means is effective, the secondary evaporator 36 extracts more heat from the compartment 17 while the elements 58 impart heat to compartment 17 at substantially the same rate as heat is removed therefrom. Thus while the temperature gradient between the cooling surfaces of liner 14 and air within compartment 17 has materially increased, the temperature within compartment 17 is maintained substantially constant. During this time the low temperature of evaporator 36 and consequently the below-freezing temperature of spots or areas on the inner cooling surfaces of liner 14 causes excessive moisture within compartment 17 and excessive moisture in the air therein to be deposited on the cold interior wall surfaces of liner 14 in the form of frost or ice while the temperature within compartment 17 is being maintained at the desired or normal food storage temperature within a range of 40° to 50° F. Upon observing that the moisture content of compartment 17 has been lowered or eliminated, the user actuates switch 69 into open position to break the electric circuit to heaters 58. The abnormal low temperature produced by the secondary evaporator 36, when the heating elements 58 are deenergized, tends to lower the temperature within compartment 17 below its desired or normal range hereinbefore specified. Consequently the temperature of bulb 53 is lowered and the thermostatic system with which it is associated actuates throttle valve 51 toward closed position to thereafter restrict flow of refrigerant in secondary circuit so as to restore the circuit to its normal function of maintaining evaporator 36 at its higher temperature to obtain the desired normal temperature range within compartment 17 of 40° to 50° F. The higher temperature of evaporator 36 causes the frost or ice accumulated on the cold areas of inner wall surfaces of liner 14 to thaw or melt and the resultant water flows downwardly therefrom to the bottom wall of compartment 17. This water represents the excess moisture removed from the air within compartment 17 and flows across the inclined bottom wall of compartment 17 into drain pipe 43 and is conveyed to the exterior of the compartment where it may be disposed of in any suitable or conventional manner.

Figure 4:
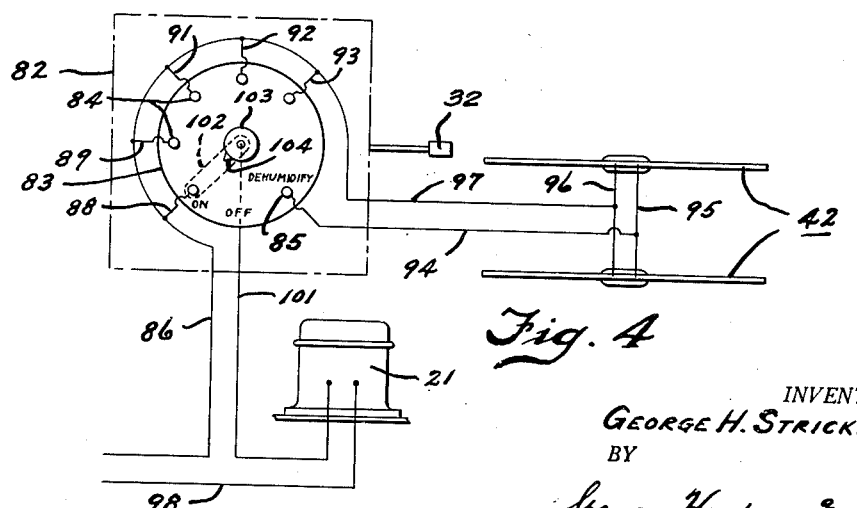
Fig. 4 is a diagrammatic view of a modified form of control system for the refrigerating apparatus.

In Fig. 4 of the drawings I show diagrammatically a modified form of controlling my improved refrigerating apparatus wherein the adjustable thermostatically actuated throttle valve 51 in the secondary refrigerating system or circuit shown in Fig. 1 is omitted. In this form of my invention I employ a conventional so-called "Cold Control" adjustable type automatic switch such, for example, as a switch of the type described in the A. O. Grooms Patent Number 2,351,038, dated June 13, 1944. It is to be understood that in this form, the contact between the secondary condenser and the primary evaporator is calibrated to produce normal circulation of refrigerant in the secondary evaporator to maintain the interior of the normal food storage compartment 17 between 40° and 50° F. Referring now to Fig. 4, the box containing the "Cold Control" switch mechanism is indicated by the dot dash lines 82 and the tube to which bulb 32 is secured and sealed may enter this box at any desired point. This "Cold Control" switch device is provided with a dial 83 having the words "On," "Off" and "Dehumidify" and the numerals "1," "2," "3" and "4" marked thereon. These words and numerals, with the exception of "Off," are placed adjacent to or in alignment with a plurality of spaced apart contacts 84 and a contact 85 contained in the switch box 82. The contacts 84 are all connected to the one wire 86 of an electric power line by branch wires 88, 89, 91, 92 and 93. Contact 85 is connected to the electric heaters 58 within shelves 42 by wires 94 and 95. The opposite ends or posts of the heaters 58 in shelves 42 have a wire 96 leading therefrom and connected to power line 86 through a wire 97. The other power line 98 of the electric power circuit leads to one terminal of the motor-compressor unit 21 and the other terminal thereof has a wire 101 extending therefrom and connected to a movable metal finger element 102 contained in the switch box 82 and adapted, when rotated, to engage and complete a circuit through one or the other of the contacts 84. A knob 103 is keyed or otherwise secured to a shaft which carries the finger 102 and is provided with a pointer 104 thereon for indicating to the user which of the contacts 84 are engaged by finger 102.

The numerals 1, 2, 3 and 4 and the word "Dehumidify," on dial 83 of the switch disclosed in Fig. 4, indicate different positions to which the switch 82 may be adjusted to obtain progressively lower temperatures within the primary evaporator and, since the temperature of the secondary evaporator follows the temperature of the primary evaporator, to obtain progressively lower temperatures within the secondary evaporator. The coldest temperature is obtained with the switch set to the "Dehumidify" position. In this position of the switch 82, the heater elements 58 are also energized.

Suppose now that an excess amount of humidity is present in compartment 17. In this event, the switch knob 103 is moved so as to set the pointer 104 at the "Dehumidify" position whereupon finger 102 engages the contact 85. In this position of knob 103, the maximum resistance is added to the switch mechanism against actuation thereof by the thermostatic system, and an electric circuit is completed through wires 86, 97 and 96 to the heaters 58 in shelves 42 and from the heaters 58 through wires 95, 94, contact 85, finger 102, wire 101, through the motor-compressor unit 21 and power line wire 98. The heaters 58 are thereby energized and the motor of unit 21 is also energized to cause operation of the compressor of unit 21. Operation of the compressor of unit 21 causes the temperature of the primary evaporator 20 to be reduced to its lowest point and consequently secondary evaporator 36 to be lowered below freezing. In this manner the secondary evaporator 36 and heaters 58 function simultaneously to provide a dehumidifying means for compartment 17, acting effectively without materially changing the temperature therein, as described in connection with the form of my invention disclosed in Figs. 1, 2 and 3. In other words, the temperature gradient between the liner inner wall cooling surfaces and air within compartment 17 has been increased above normal while the temperature of this compartment remains constant and excess moisture freezes on the liner cooling surfaces. After it is observed that the moisture content of compartment 17 and articles stored therein has been lowered or eliminated the knob 103 and consequently the bridging finger 102 is moved away from contact 85, "Dehumidify" position, into one of the other positions indicated by the numerals on dial 83 of switch 82 so as to return the refrigerating system to normal operation under the control of the thermal bulb 32. In this illustration it should be obvious that the objective of my invention can be attained without employing a thermostatically operated throttling valve in the secondary refrigerating system or circuit.

Referring now to Fig. 5 of the drawings I have shown somewhat diagrammatically a still further form of my invention wherein operation of my improved refrigerating apparatus is fully automatic for accomplishing the desired results. In this form of my invention a valve 111 in the secondary refrigerant circuit is of the fully open and/or closed type, as distinguished from the throttling valve shown in Fig. 1, and is provided with a restricted by-pass, which may be incorporated in the valve housing, to afford proper circulation of refrigerant in the secondary circuit under normal operating conditions of the refrigerating apparatus. Valve 111 may be of any suitable or conventional construction and is preferably of a type capable of being readily actuated by movement of an armature of a solenoid. It is to be understood, however, that this valve could, if desired, be a motor-operated valve. By reference to Fig. 5 it will be noted that to render this refrigerating apparatus fully automatic I locate a suitable or conventional humidistatic switch 112 within compartment 17. The power lines 33 and 34 leading to switch 31 and motor-compressor unit 21 have branch wires 116 and 117 respectively leading therefrom. Wire 116 has a portion thereof coiled around the armature of solenoid 118 and is then connected to one side of a switch portion of the humidistat 112. The armature 120 of solenoid 118 is attached to valve 111 and is adapted to open and/or close this valve. A wire 119 is connected to the other side of the switch portion of humidistat 112 and leads to one terminal post of the heaters 58 in shelves 42. The branch wire 117 from power line 33 leads to the other terminal post of the heaters 58. By virtue of the by-pass around the valve 111, heretofore mentioned and diagrammatically indicated at 121, the refrigerating system of this modified apparatus normally functions in the same manner as conventional two-temperature refrigerators now in use and wherein no separate temperature control is provided for the evaporator of the secondary refrigerant circuit. In other words a proper amount of refrigerant flows from the secondary condenser 37 through by-pass 121 to cause evaporator 36 to produce satisfactory normal refrigerating temperature to maintain the interior of compartment 17 between 40° and 50° F.

When the amount of humidity in the environment air increases to such a point as to cause an excessive amount, or accumulation of moisture in compartment 17 the humidistat 112 automatically actuates switch contacts into closed position. When the contacts of the humidistat 112 close, an electric circuit is completed to the heating elements 58 in shelves 42. This circuit is from power line 33, wire 116, through solenoid 118, the switch portion of humidistat 112 and wire 119 to one pole or terminal 61 of the heaters 58, thence back to power line 34 through wire 117 and the motor of unit 21. The completion of this circuit, in addition to starting operation of the motor-compressor unit 21 and energizing the heaters 58, also causes the armature 120 of solenoid 118 to actuate the valve 111 into full open position. Valve 111 being opened in this manner thereby permits a substantially unrestricted flow of liquid refrigerant from condenser 37 into the evaporator 36 so that the temperature of the secondary evaporator 36 will be lowered below its normal temperature. Lowering of the temperature of evaporator 36 below freezing creates cold spots or areas on the inner cooling surfaces of liner 14 and thereby causes moisture within compartment 17 to be removed therefrom and accumulated in the form of frost or ice on these cooling surfaces. The heat generated by heaters 58 in shelves 42 and the lowering of the temperature of secondary evaporator 36 to cool walls of compartment 17 below their normal temperature combine to provide a dehumidifying means for abstracting moisture from compartment 17 while at the same time maintaining the temperature of the compartment substantially constant between the limits of 40° to 50° F. When the humidity within compartment 17 decreases, by virtue of converting the moisture in the compartment to frost or ice, to a predetermined degree humidistat 112 is rendered effective automatically to open the contacts in the switch portion thereof and consequently break the electric circuit to heaters 58 and solenoid 118, whereby the armature 120 of the solenoid closes valve 111. Thereafter the refrigerating system functions normally under the control of switch 31 and refrigerant is restricted by the by-pass 121 in its flow from condenser 37 to evaporator 36 to thereby permit the temperature of evaporator 36 to increase and maintain compartment 17 between 40° to 50° F. The return to normal of the temperature of evaporator 36 in this manner eliminates the cold spots or areas on the inner or cooling surfaces of liner 14 and the frost or ice accumulated thereon thaws and the resultant water flows downwardly to the drain 43 and outwardly of compartment 17. While in this fully automatic disclosure certain of the control elements are electrically connected together in a simplified manner for illustrative purposes, it is to be understood that other connecting arrangements are possible and may be preferred without departing from the spirit of my invention. It is also to be understood that the various controls, switches and valve devices herein employed are conventional in their respective arts and for this reason they are disclosed only diagrammatically for illustrating my invention.

My invention overcomes a problem existing in two-temperature refrigerators to improve the same and render such refrigerators universally satisfactory for use in various localities throughout the country where climatic conditions differ considerably. From the foregoing it should be apparent that the combined and substantially simultaneous lowering of the temperature of the evaporator of the secondary refrigerating system, and application of heat to the interior of the normal food storage compartment provides a dehumidifying means which permits the user of the refrigerating apparatus to quickly and readily eliminate over-moist conditions in the compartment without materially affecting or changing the temperature therein. By eliminating overmoist conditions within the compartment a more satisfactory storage of foods therein is obtained and complaints with respect to water dripping from parts within the compartment into foodstuffs therein will be reduced.

While the forms of embodiment of the invention as herein disclosed, constitute preferred forms, it is to be understood that other forms might be adopted, as may come within the scope of the claims which follow.

What is claimed is as follows:

1. A household refrigerator cabinet comprising an insulated compartment for the reception and storage of perishable food products, means for cooling said compartment to a desired temperature range of approximately 40° to 50° F. for preserving the food products, said means including a single evaporator having a sufficient amount of cooling surface so that the temperature gradient between the compartment temperature and the cooling surface temperature is very small whereby to maintain a high percentage of humidity in the food storage compartment, means for removing excess humidity from said compartment without materially changing the compartment temperature, said last named means including heating means associated with the food storage compartment, means for energizing said heating means to add heat to said compartment, and means for simultaneously lowering the temperature of the cooling surface substantially below the normal temperature thereof to compensate for and to remove the added heat thereby to maintain the compartment temperature between said desired range, the said cooling surface at its lowered temperature condensing moisture thereon from the excess humidity within said food storage compartment.

2. A household refrigerator cabinet comprising an insulated compartment for the reception and storage of perishable food products, means for cooling said compartment to a desired temperature range of approximately 40° to 50° F. for preserving the food products, said means including a single evaporator having a sufficient amount of cooling surface so that the temperature gradient between the compartment temperature and the cooling surface temperature is very small whereby to maintain a high percentage of humidity in the food storage compartment, means for removing excess humidity from said compartment without materially changing the compartment temperature, said last named means including heating means within the food storage compartment, means for energizing said heating means to add heat to the interior of said compartment, means for simultaneously lowering the temperature of the cooling surface substantially below the normal temperature thereof to compensate for and to remove the added heat thereby to maintain the compartment temperature between said desired range, the said cooling surface at its lowered temperature condensing moisture thereon from the excess humidity within said food storage compartment, and means for de-energizing said heating means and simultaneously therewith returning the said cooling surface to its original temperature.

3. A household refrigerator cabinet comprising an insulated compartment for the reception and storage of perishable food products, means for cooling said compartment to a desired temperature range of approximately 40° to 50° F. for preserving the food products, said means including a single evaporator having a sufficient amount of cooling surface so that the temperature gradient between the compartment temperature and the cooling surface temperature is very small whereby to maintain a high percentage of humidity in the food storage compartment, means for removing excess humidity from said compartment without materially changing the compartment temperature, said last named means including an electric heating element associated with the food storage compartment, a switch for energizing said electric heating element to add heat to said compartment, and means for simultaneously lowering the temperature of said cooling surface substantially below the normal temperature thereof to compensate for and to remove the added heat thereby to maintain the compartment temperature between said desired range, said cooling surface at its lowered temperature condensing moisture thereon from the excess humidity within the food storage compartment.

References Cited in the file of this patent

UNITED STATES PATENTS

| Number | Name | Date |
|---|---|---|
| 2,135,181 | Jones | Nov. 1, 1938 |
| 2,292,486 | Steinfeld | Aug. 11, 1942 |
| 2,304,411 | Keighley | Dec. 8, 1942 |
| 2,375,714 | Wild | May 8, 1945 |
| 2,433,187 | Alsing | Dec. 23, 1947 |
| 2,488,161 | Benson et al. | Nov. 15, 1949 |
| 2,500,778 | Tobey | Mar. 14, 1950 |
| 2,515,388 | Andersson | July 18, 1950 |
| 2,580,220 | Cooper | Dec. 25, 1951 |